United States Patent [19]

Barber et al.

[11] 4,160,422

[45] Jul. 10, 1979

[54] PROGRAMMABLE SEWING SYSTEM WITH AUXILIARY MEMORY

[75] Inventors: Warren A. Barber, Martinsville; Henry A. Seesselberg, South Plainfield, both of N.J.

[73] Assignee: The Singer Company, New York, N.Y.

[21] Appl. No.: 943,505

[22] Filed: Sep. 18, 1978

[51] Int. Cl.² .............................................. D05B 19/00
[52] U.S. Cl. ................................................ 112/121.11
[58] Field of Search .................... 112/121.11, 121.12, 112/158 E, 275, 277; 318/568; 346/33 MC

[56] References Cited

U.S. PATENT DOCUMENTS

3,977,338  8/1976  Wurst et al. ................. 112/158 E X
4,092,937  6/1978  Landau, Jr. et al. ............ 112/121.11
4,092,938  6/1978  Coughenour et al. ........... 112/158 E

*Primary Examiner*—Peter Nerbun
*Attorney, Agent, or Firm*—Edward P. Schmidt; David L. Davis; Robert E. Smith

[57] ABSTRACT

An auxiliary memory unit for an industrial sewing system having the capability to record, in a first mode of operation, data pertinent to a sequence of stitching operations and to actuate, in a second mode of operation, the stitching sequence recorded in the first mode of operation. The auxiliary memory unit utilizes a replaceable memory medium. An interface arrangement is provided for transferring information between the sewing system memory and the replaceable memory medium.

6 Claims, 3 Drawing Figures

PROGRAMMABLE SEWING SYSTEM WITH AUXILIARY MEMORY

BACKGROUND OF THE INVENTION

This invention is in the field of industrial sewing machines, more particularly, an industrial sewing machine adapted to have the components thereof operated by a computer which may store data in an initial manual operation by an operator.

Recently, in the U.S. Pat. No. 4,092,937, issued on June 6, 1978 there is disclosed a programmable sewing system consisting broadly of a sewing machine, a computer and a manually actuated control panel coupled to the computer for entering sewing instructions and having display means for receiving display information from the computer. The computer of this sewing system includes a RAM or read-write-memory for receiving data relative to operation of certain of the sewing machine components and for actuating operation of those components in an automatic mode of operation. However, the use of a read-write-memory has certain limitations inasmuch as it has only a limited capacity. Also, the usual read-write-memory is a volatile memory which requires that power be continually applied in order to preserve the information stored therein. A still further disadvantage is that the data stored in the read-write-memory may be inadvertently erased by maintenance personnel or by an operator due to error. Still another disadvantage is that the data stored in the computer is available only to the sewing machine to which the computer is attached.

What is required is some means to expand the memory of the sewing system in a form which does not require the continual application of power to retain a memory, which is in a more permanent form not readily susceptible of inadvertent erasure and which may be used with other sewing machines.

SUMMARY OF THE INVENTION

The above requirements are met in an industrial sewing machine system having an auxiliary memory unit connected through an interface to the computer of the sewing system. A magnetic tape cassette recorder/player may be utilized as the auxiliary memory, the cassette unit having a microphone input and an earphone output to, respectively, receive information for recording and output information for playback. In order to adapt the use of a cassette recorder with an existing sewing system additional software is provided to enable the calling up of the data from the sewing system for transfer to the cassette recorder or to enable information from the cassette to be transferred to the read-write-memory of the sewing system. In the record or playback mode a specific address is transferred from the sewing system to an address decoder which provides an address to an Asynchronous Communication Interfacer Adaptor (ACIA). The ACIA is then able to receive data in parallel form from a eight bit data bus from the sewing system and convert this data into serial form, synchronize the data according to a transmit clock and pass it on to a two tone sine wave generator. The two tone sine wave generator creates a logic "1" of 2,930 hertz or a logic "0" of 1,465 hertz according to the serial data generated by the ACIA and supplies audio signals to the microphone input of the cassette recorder. In the playback mode the cassette recorder outputs the audio signals to a two tone detector which then supplies serial data to the ACIA. The ACIA converts the serial data to a parallel form and will transmit this data via the eight bit data bus to the sewing system. Internal timing signals are provided in order to insure that each byte of data has been properly transmitted or received prior to release of the next byte of data.

BRIEF DESCRIPTION OF THE DRAWINGS

In order that the invention may be more fully understood it will now be described, by way of example, with reference to the accompanying drawings in which.

Figure 1:
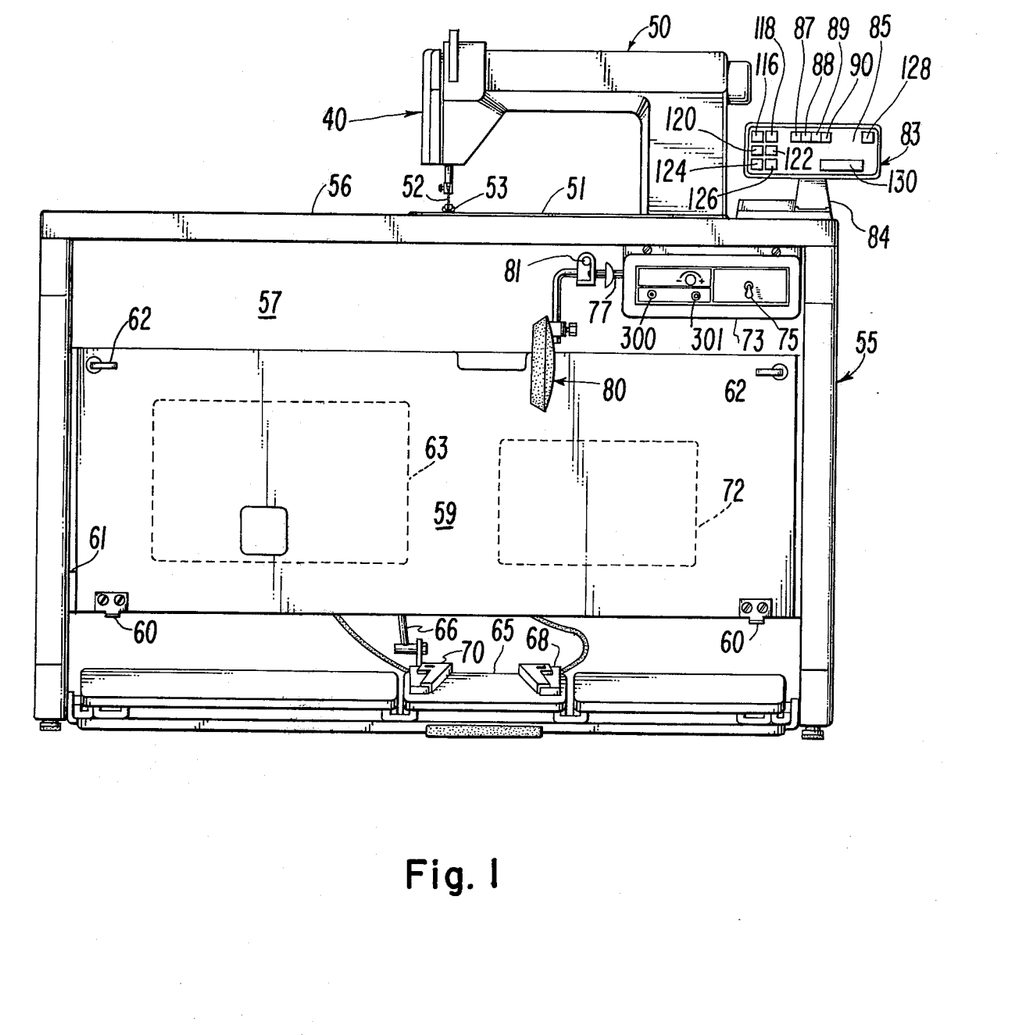
FIG. 1 is a front elevational view of the sewing machine and work table supporting the sewing machine, components and control systems for implementing the programming and operation of the sewing machine.

Referring to FIG. 1, there is shown an industrial sewing system 40, including a sewing machine 50 supported in a work table 55. A work supporting bed 51 of the sewing machine 50 is supported substantially coplanar with the work supporting top 56 of the work table 55. The sewing machine 50 includes a drive system (not shown), and may be pivotably supported in the work table 55 in a manner similar to that shown in the U.S. Pat. No. 3,924,552, of Wendel. As is shown in the above noted patent, the drive system for the sewing machine 50 is supported beneath the sewing machine behind a fixed front panel 57 thereof and, therefore, concealed from view. Pivotably supported in the base of the work table 55, is a foot treadle 65, connected by linkage 66 to electrical devices mounted on a sewing machine control box 63, which is supported within the work table behind a hinged front panel 59, itself supported on hinges 60 affixed to cross-member 61 of the work table. The hinged front panel 59 is retained in a closed state by latches 62, which may be disengaged to rotate the front panel downwardly, exposing the sewing machine control box 63 and a computer 72 also there supported by the work table 55. Supported on either side of the foot treadle 65, for selective actuation by lateral motion of an operators foot, in a jog switch 68 for placement of a single stitch, and a needle-up positioning switch 70 in order to obtain operator determined up positioning of a sewing needle 52.

Supported on the right side of the work table 55, beneath the work supporting top 56, is a small box 73 in which are mounted a main power switch 75 and a presser foot elevating switch 77. A knee shift device 80 is pivotably supported on a pivot bar 81 affixed to the fixed front panel 57. An abutment member 82 of the knee shift device 80 cooperates with the presser foot elevating switch 77 in order to effect elevation of a presser foot 53 of the sewing machine 50. Raising and lowering of the presser foot 53 may be accomplished by a modification of the system disclosed in the U.S. Pat. No. 3,224,393, of Adams et al. Thus, motion of the presser foot 53 may be pneumatically accomplished and controlled by a solenoid actuated valve which is activated by the presser foot elevating switch 77.

Supported on the upper right front corner of the work supporting top 56 of the work table 55 on a pedestal 84, is a control module 83 having a control panel 85. The control module 83 is in electrical communication with the computer 72 by means of electrical wires passing through the pedestal 84 to the computer.

The sewing machine drive system referred to above, may be of a known variety, or any modification thereof, suitable for operation by the computer 72 through the sewing machine control box 63 which iis considered a part of the sewing machine 50. Such a drive system is shown in U.S. Pat. No. 3,573,581, issued Apr. 6, 1971 to Dutko et al. This patent discloses a continuously coupled DC motor for an industrial sewing machine, having the circuitry to sense the speed thereof, to initiate dynamic braking thereof to a selected needle-up or needle-down position and to initiate a thread trimming operation. The drive system disclosed in the patent of Dutko et al may be modified to a belt drive arrangement as is shown in the above referenced patent to Wendel, and may have a mechanical brake attached thereto, as disclosed in the U.S. Pat. No. 3,667,413 of Kleinschmidt et al. The above referenced patent of Dutko et al, discloses sensors to indicate an up position of the sewing needle 52 out of a work material and to indicate a down position thereof. There are also disclosed speed sensors from which may be obtained a determination of rotational speed of the sewing machine 50. The information obtained from these sensors may be transferred to the computer 72, and will be used by the computer as conditions for initiating other actions of component parts of the sewing system 40. For example, the drive system disclosed in the referenced patent of Dutko et al, is operated by the foot treadle 65 for variable speed by variable forward depression thereof from a neutral position; and, as disclosed in the patent of Dutko et al, may be heeled or rotated in a reverse direction to effect a thread trimming function, the neutral condition causing the computer 72 to initiate commands to dynamically brake the drive system to a speed of approximately 400 RPM followed by mechanical braking to a needle-down position, and the heel position causing the computer to initiate commands serially to perform a last tack, to drive and mechanically brake to a needle-up position while performing the thread trimming operation. The computer 72 may also be used to control the speed of the sewing machine 50 by utilizing the speed sensing device disclosed in the Dutko et al patent as will be explained below.

Further reference may also be had to the U.S. Pat. No. 3,715,642, of Walter. This patent of Walter is a further reference disclosing a DC motor having speed sensors, position sensors, variable speed drive and capability to include thread trimming functions. Imposition of a stable reference voltage in place of the variable reference voltage of the Walter patent provides a fixed sewing machine speed, and the computer 72 may be utilized to implement the required stable voltages for the required periods.

Any of a number of thread trimming devices may be incorporated in this machine, one such device being that disclosed in U.S. Pat. No. 3,776,161, issued Dec. 4, 1973 to Papajewski et al.

The control module 83 and control panel 85 is, as stated above, electrically connected with the computer 72 supported behind the front hinged panel 59. The control panel 85 is, preferably, of a "dead front" form, that is, only those displays of instant concern to an operator are visible. In FIG. 1, is shown an elevation of the control panel 85, indicating part of the displays which may become visible to a sewing machine operator by lighting devices within the control panel as determined by the computer 72 supported behind the front hinged panel 59. The windows 87-90 in the control panel 85 are used to display numerical digits, or alphabetic instructions, such as the word "SEW", "RECD" or "PLAY" as directed by the computer 72.

The displays on the control panel 85, shown in FIG. 1, with the exception of the windows 87-90, receive information from the operator to be acted on by the computer 72. These displays are, generally, switches which place the sewing system in the various modes of operation, or modify the displays in the windows 87-90, and/or call on the computer 72 to perform certain acts. These switches in the displays are, ideally, activated by a proximity detector responsive to the presence of an operator's finger. Thus, those displays which are placed in the active mode and made visible to an operator by the computer 72, will respond to the presence of an operators finger to convey to the computer the selected action desired. Once again, it is apparent that the various functions may be as readily implemented by slide or toggle switches, however, by use of a "dead front" panel, operator direction and guidance may be most effectively implemented.

The control panel 85 in FIG. 1 is shown substantially as it would appear after the main power switch 75 has been turned on, in the Initialization Mode Entry. In this Initialization Mode Entry, the operator is required to select one of the seven entry modes by touching the appropriate display pad with a finger. The entry display pads shown in FIG. 1 which are visible in the Initialization Mode Entry are Automatic Sew (AS) 116, Automatic Learn (AL) 118, Control Sew (CS) 120, Key Learn (KL) 122, Manual Sew (MS) 124, Set up (S) 126, Clear Memory (Erase) (E) 128 and Entry 130.

For a greater understanding of the programmable sewing system disclosed in FIG. 1 the reader is referred to the U.S. Pat. No. 4,092,937, issued on June 6, 1978 to Landau et al, which is assigned to the same assignee as the present invention, and is hereby incorporated by reference and made a part of this application.

To the sewing system as disclosed in the above referenced patent there are added jacks 300, 301 in the box 73 which are meant for connection respectively to the inputs and outputs of an auxiliary memory unit. Illustratively, an audio tape cassette recorder/player may be utilized as the auxiliary memory unit. In such case, the jacks 300, 301 would be connected to the microphone jack and the earphone jack, respectively, of the tape cassette unit. The phono jacks 300, 301 are connected by lines (not shown) to the computer 72 of the sewing system 40.

Figure 2:
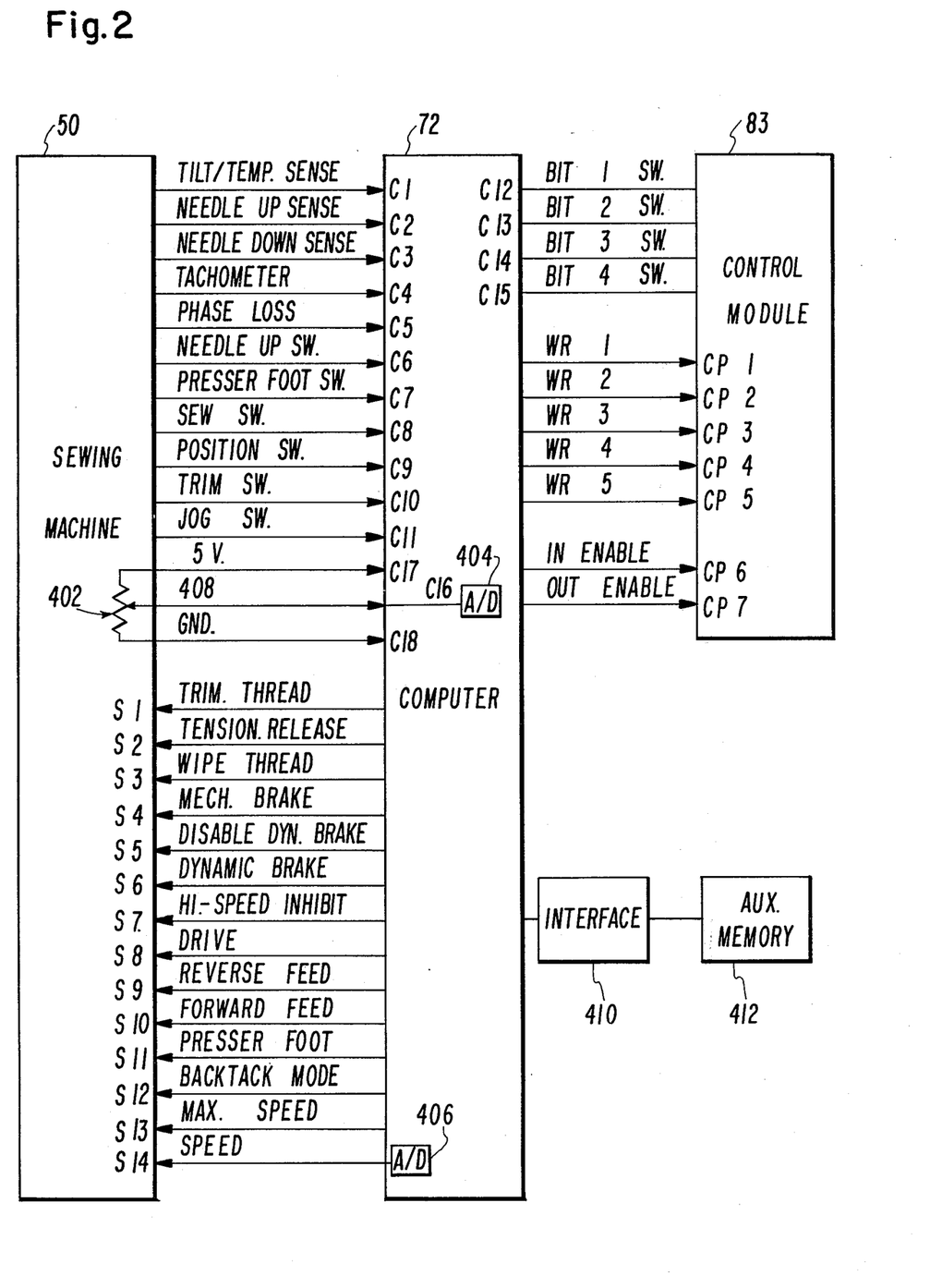
FIG. 2 is a representation of the sewing system in block diagram form indicating the interconnection between the sewing machine, computer, control panel, interface and recorder thereof.

The operation and features of the sewing machine system described hereinabove are achieved by the use of the computer 72, the control module 83 and the sewing machine 50 which are electrically interconnected in a manner as illustrated in FIG. 2. As illustrated, the computer 72 receives various electrical signals representative of various sewing machine component operations from the sewing machine 50 on terminals C1–C11 and C16, the sewing machine receives various electrical signals for controlling various sewing machine component operations from the computer on terminals S1–S14, the computer receives various sewing control signals from the control module 83 on the terminals C12–C15 and the control module receives various electrical display and illuminates signals from the computer on terminals CP1–CP5 and input and output control signals on terminals CP6 and CP7, respectively.

A signal appears on terminal C1 of the computer 72 whenever the sewing machine 50 exceeds a predetermined tilt angle or whenever the temperature of the sewing machine drive motor of the drive system exceeds a predetermined temperature. The signal on the terminal C1 is derived from a mecury switch (not shown) fixedly mounted within the sewing machine 50 for detecting the physical position thereof and, when present, prevents the sewing machine from being actuated, such as when repairs are being made and the like. The signal on terminal C1 is also derived from a thermocouple (not shown) mounted on the drive motor of the drive system to provide a signal which, when present, disables the sewing machine 50 when the drive motor becomes overheated. A signal appears on the terminal C2 of the computer 72 whenever the sewing needle is in a down position. These signals are derived in a well known manner by a pair of slotted discs (not shown) mounted on the drive shaft of the sewing machine 50 which cause a light path between a light source and a light detector to be uninterrupted when the sewing needle 52 is in the up and down position, respectively. The signal appearing on the terminal C4 of the computer 72 indicates the speed of the sewing machine drive motor and comprises a series of pluses that are derived from a slotted disc (not shown) mounted on the drive shaft of the sewing machine 50 and which interrupts a light beam (not shown) in a well known manner. In one embodiment of the present invention which was constructed, these pulses were utilized by the computer 72 when the sewing machine 50 was being stopped to determined when the sewing speed had decreased to the point where dynamic braking was disabled with subsequent activation of mechanical braking. A signal appears on terminal C5 of the computer 72 whenever any one, or more, of the three phases of input power to the sewing machine 50 is lost and, when present, results in the sewing machine being disabled. The signal is obtained by comparing a reference level with the average level of rectified voltage obtained from the three phase power source. As long as all three phases are present, the rectified level average exceeds the reference level and no signal appears on terminal C5. However, if one or more phases are lost, the average rectified level falls below the reference level thereby providing a signal at terminal C5 that results in the sewing machine 50 being turned off. A signal appears on the terminal C6 of the computer 72 whenever the needle-up positioning switch 70 is actuated and results in rotation of the drive shaft of the sewing machine 50 until the sewing needle 52 is in its up position which, as described above, is indicated by a signal at terminal C2. A signal appears on terminal C7 of the computer 72 whenever the presser foot elevating switch 77 is actuated and results in the presser foot 53 being raised. A signal appearing on terminal C11 due to operator actuation of the jog switch 68 causes the sewing machine to sew one stitch. A three position switch (not shown) is coupled to the sewing machine foot treadle 65 and provides a signal on terminal C8 of the computer 72 whenever the foot treadle is actuated into a forward sewing position, provides a signal on terminal C9 whenever the foot treadle is in the neutral position and provides a signal on terminal C10 whenever the foot treadle is heeled. Also coupled to the foot treadle 65 is the potentiometer 402 having wiper arm 408. Operating potential across the potentiometer 402 can be supplied from terminals C17 and C18 of the computer 72. As the foot treadle 65 is actuated during a sewing operation, the wiper arm 408 is moved by movement of the foot treadle to provide a DC voltage level on terminal C16 that is proportional to the sewing speed. The computer 72 contains conversion means 404 therein to convert the analog signal appearing on terminal C16 into digital signals which are stored within the computer as pseudo segments. For further particulars on the pseudo segments, reference may be had to the above referenced patent of Landau et al.

Whenever a thread trim and wipe operation is to be performed, either as a result of an operator heeling the foot treadle 65 or as a result of a stored program in the computer 72, three signals are simultaneously provided on terminals S1, S2 and S3 of the sewing machine 50 by the computer. The signal on terminal S1 actuates the sewing machine 50 thread trimmer, the signal on the terminal S2 actuates the sewing machine thread tension release solenoid and the signal on terminal S3 actuates the wiper thread mechanism, to perform a complete thread trim operation.

The sewing machine 50 is stopped by first dynamically braking the drive system to a speed of about 400 RPM followed by mechanical braking. The computer 72 provides a signal on terminal S6 of the sewing machine 50 to initiate dynamic braking of the drive system. Once the speed of the drive system is reduced sufficiently (as described above, the computer utilizes the pulses appearing on terminal C4 to determine drive motor speed), a signal appears on terminal S5 to disable dynamic braking after which a signal appears on the terminal S4 to actuate mechanical braking of the drive motor to completely stop the drive system.

A signal on terminal S7 of the sewing machine 50 from the computer 72 provides a drive motor control signal to result in a fixed sewing speed of about 400 stitches per minute, i.e., the position sewing speed. As long as this inhibit signal is present on terminal S7, operation of the foot treadle 65 has no effect on sewing speed. A signal on terminal S9 causes the direction of motion of the material being sewn to move toward the operator (reverse feed), whereas a signal on terminal S10 causes the direction of motion of the material being sewn to move away from the operator (forward feed). A signal appearing on terminal S11 causes the sewing machine 50 presser foot 53 to be raised. A signal appearing on terminal S12 provides a drive motor control signal that causes the sewing machine 50 to sew at a fixed rate of about 1000 stitches per minute. A signal appearing on terminal S13 provides a drive motor control signal that limits the sewing speed to the rate set as the maximum sewing speed of the sewing machine 50 in a Set Up Mode of operation described in the above referenced patent of Landau et al.

Whenever a signal appears on the terminal S8, the sewing speed can be controlled by operator actuation of the foot treadle 65 in a Manual Mode of operation. This results in an analog signal having a level that is proportional to the desired speed appearing on terminal S14, after being derived from the potentiometer 402. In an Automatic Sew Mode of operation, the analog signal level appearing on terminal S14 can be derived from the pseudo segment digital speed values, described hereinabove, which are stored in the computer 72. Conversion means 406 convert these stored digital signals into an analog voltage. As described in the above referenced patent of Landau et al the stored digital signals may correspond directly to the speed profile of the operator or the speed of the pseudo segments may be increased or decreased by way of the control module 83.

The control module 83 includes a control panel 85 which includes, as described above, a plurality of touch pads that are manually actuated. Actuation of any of these touch pads results in a four bit binary signal, that identifies the actuation touch pad, being coupled from the control module 83 to terminals C12, C13, C14, and C15, respectively, on the computer 72. The transfer of such data from the control module 83 to the computer 72 can only take place if an enable out signal from the computer appears on control module terminal CP7. Circuit means for deriving a multi bit binary coded signal that identifies an actuated one of a plurality of touch pads is fully disclosed in copending application Ser. No. 732,228 entitled CHARGE RATE CAPACITIVE SWITCH SYSTEM, filed Oct. 14, 1976 and assigned to the assignee of the present invention. The disclosure of this patent application is incorporated herein by reference.

As described hereinabove, the control module 83 includes display means as well as means for selectively back illuminating portions of the control panel 85. Signals for actuating various segments of the display and the illuminating means are provided by the computer 72 to terminals CP1, CP2, CP3, CP4 and CP5 of the control module 83. These signals have no effect on the display means or the illuminating means unless an enable signal is present on terminal CP6 from the computer 72. Control and actuation circuit means for a segmented display, alphabetic or numeric, and back illuminating means are well known in the art and need not be described herein for a complete and detailed description of the present invention.

As will be apparent to those skilled in the art, the signals discussed above may include a positive or negative voltage level as well as the absence of a voltage i.e., ground potential. Additionally, a commond ground connection (not shown) couples the sewing machine 50, the computer 72 and the control module 83. As is now apparent to those skilled in the art, the signals generated by the computer 72 and appearing on terminals S1–S14 are generated in response to manual operation of the sewing machine 50 or in response to a sewing pattern stored in the computer 72.

For a fuller understanding of the sewing system thus described the reader is referred to the above referenced U.S. patent of Landau et al.

To the sewing system described in the above referenced patent there is added an interface 410, which will be further described below, connected to the computer 72; and an auxiliary memory 412 connected to the interface.

The computer 72 includes a memory, part of which is for program storage for controlling sewing machine operations. The remaining part of the memory is a writable memory for storing operator generated sewing data; generated during an initial "learning" cycle as explained in the above referenced patent of Landau et al. The writable portion of the memory in the computer 72 is a volatile memory which will store a finite amount of data. A requirement for storage of additional data over that finite amount will first require removal of some portion of the operator generated data from the memory which can only be regenerated in another "learning" cycle. The volatile memory is, therefore, not a permanent record and is susceptible to loss of data by power loss, operator or maintenance man error. Additionally, the information contained in the volatile memory of the computer 72 is available only to operate the sewing machine 50 with which it is connected. It is proposed to eliminate the above drawbacks by using an auxiliary memory 412 in order to increase the memory capability of the sewing system 40 in a more permanent form which is not susceptible to power loss or error, and which may be used with other similarly equipped machines.

Figure 3:
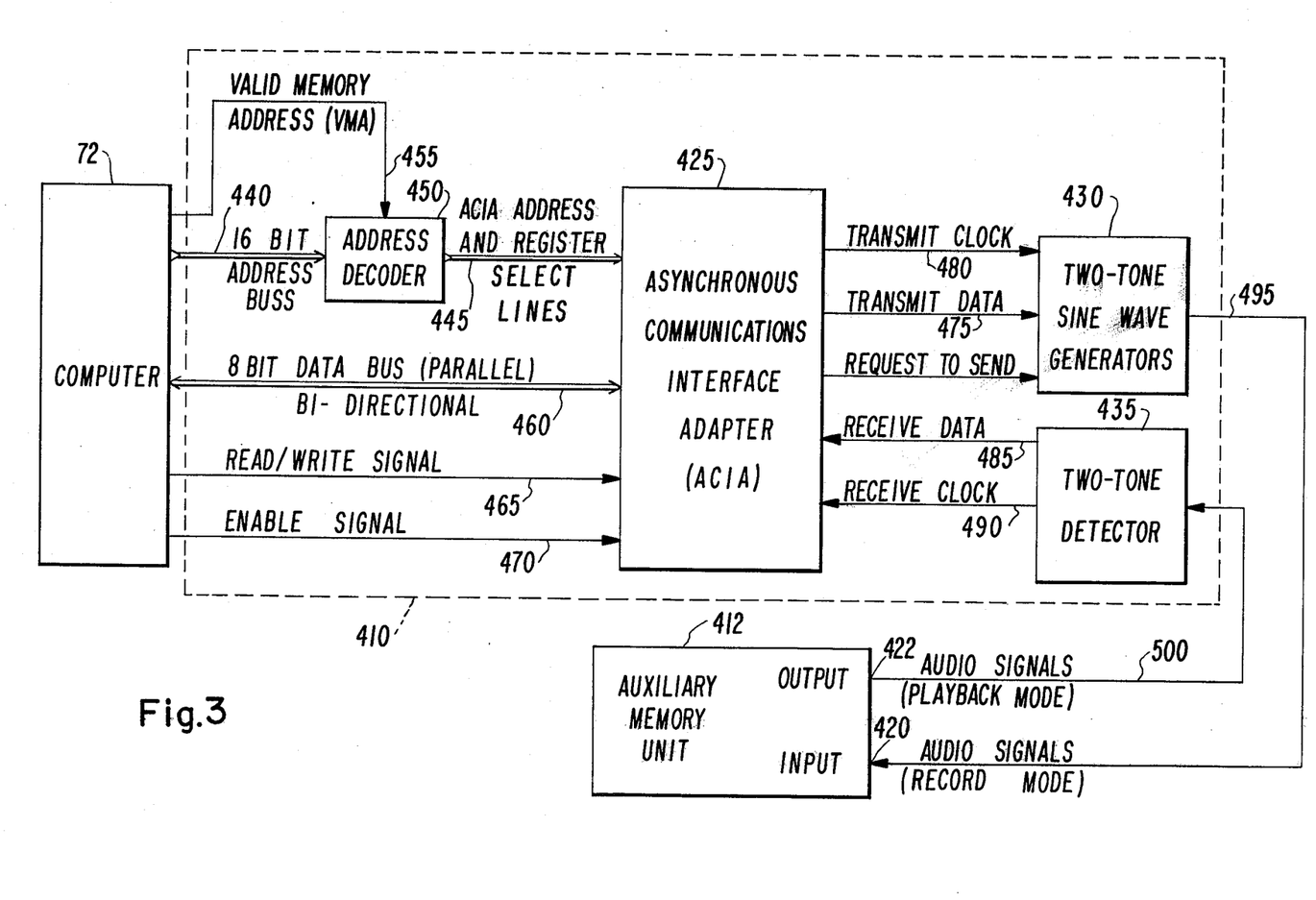
FIG. 3 is an enlarged block diagram of the interface shown in the block diagram of FIG. 2.

Referring now to FIG. 3, shown therein is an expanded block diagram of the interface circuit 410 (FIG. 2) showing its connections to the computer 72 and the auxiliary memory unit 412. For illustrative purposes, the auxiliary memory unit 412 is an audio tape cassette recorder/player having its microphone input 420 connected to the jack 300 (FIG. 1) and its earphone output 422 connected to the jack 301 (FIG. 1). Although a cassette recorder/player is illustrated, it is contemplated that other auxiliary memory units may be utilized such as for example, a floppy disc. Utilizing a cassette recorder/player, information is recorded in the form of audio signals. If some other memory device is utilized, it is understood that a different information recording process may be required. A requirement of the auxiliary memory unit is that it is capable of receiving a replaceable memory medium, such as a tape cassette, floppy disc, etc.

The interface 410 includes an asynchronous communications interface adapter (ACIA) 425 which is illustratively an MC6850 integrated circuit manufactured by Motorola Inc. The interface 410 further includes a two tone sine wave generator 430 and a two tone detector circuit 435. The ACIA 425, the two tone sine wave generator 430 and the two tone detector 435 may be purchased as part of an MEK6800D2 computer kit sold by Motorola Inc. and fully described in the MEK6800D2 Manual, Second Edition, 1977, published by Motorola Inc., the contents of which are hereby incorporated by reference. This circuitry stores and retrieves data on an ordinary audio cassette at approximately a 33 characters per second serial clock rate. The data is stored on the tape using a modified "Kansas City Standard" recording format. The format is designed to eliminate errors due to audio system speed variations and, as modified, has the following characteristics incorporated in a control program in the computer 72:

1. A mark (logical 1) is recorded as eight cycles of a 2930 Hertz signal.
2. A space (logical 0) is recorded as four cycles of a 1465 Hertz signal.
3. A recorded character consists of a space as a start bit, eight data bits and two or more marks as stop bits.
4. In the data character, the least significant bit (LSB) is transmitted first and the most significant bit (MSB) is transmitted last.
5. The data is organized in blocks of 256 bytes (except for the last block which may be less) separated by 25 marks.
6. Meaningful data is not recorded on the first 30 seconds of tape following the clear leader.
7. At the beginning of tape (BOT) the ASCII character for the letter "B" is recorded following 1024 marks (approximately 30 seconds).
8. The "B" is followed by one byte containing the block length (up to 256 bytes in a particular block).
9. The next two bytes recorded contains the starting address in memory from which the data is coming.

10. Up to 256 bytes of data are then recorded and followed by 25 marks and the ASCII character for the letter "G".

The address information for the ACIA 425 is transmitted from the computer 72 over a sixteen bit address bus 440 to the ACIA address and register select lines 445 via an address decoder 450 which also receives a signal from the computer 72 over the lead 455 indicating a valid memory address (VMA). The data to be stored in, or taken from, the auxiliary memory unit 412 is transmitted between the computer 72 and the ACIA 425 over a bi-directional eight bit parallel data bus 460 and a read-write control signal and an enable signal are supplied from the computer 72 to the ACIA 425 over the leads 465 and 470 respectively.

The ACIA 425 is, in effect a bus oriented, universal, asynchronous receiver/transmitter. It includes a bi-directional serial/parallel converter. In the transmit mode, it accepts parallel eight bit data over the bus 460, adds the formatting start bit and stop bit, and then converts the data to a serial binary stream over the lead 475 and further provides a clock signal over the lead 480. In the receive mode, the ACIA 425 accepts an incoming serial data stream over the lead 485 and a sampling clock over the lead 490. It strips off the start/stop bits and passes each incoming byte to the computer 72 for transfer to memory. During the record mode, the two sine wave generator 430 operates on the serial data on the lead 475 to convert each logical 1 (mark) to an eight cycle burst of 2930 Hertz signal and each logical 0 (space) to a four cycle burst of 1465 Hertz signal on the lead 495 which is then recorded by the auxiliary memory unit 412. During the playback mode, the two tone detector 435 decodes the incoming frequency modulated signal over the lead 500 in order to recover the binary data and clock.

The computer 72 is illustratively an MC6802 microprocessor manufactured by Motorola Inc. Illustrative machine language programs (in the hexadecimal system) for the recording and playing back of data into and out of the auxiliary memory unit 412 are set forth in the appendices of this specification. In particular, Appendix A illustrates a record program, Appendix B illustrates a playback program, and Appendix C illustrates the subroutines utilized in the record and playback programs. These programs utilize the AFE6 internal control/status registers of the ACIA 425, located at address AFE6, and the internal transmit/receive data registers of the ACIA 425, located at address AFE7. Through the address decoder 450, the ACIA 425 is controlled to only recognize addresses AFE6 and AFE7.

The record program set forth in Appendix A performs the following functions:
1. The interrupt mask in the computer 72 is set so that no maskable interrupts are recognized.
2. The ACIA 425 is preset to an idle state through an appropriate setting of the AFE6 register.
3. The beginning and ending address of the customer data in the memory of the computer 72 is defined.
4. The customer data block is recorded in the auxiliary memory unit 412. The program for accomplishing this is essentially the PUNCH program described in the aforereferenced MEK6800D2 Manual.
5. The interrupt mask in the computer 72 is reset so that the system can function in a normal mode of operation.

Appendix B contains a similar program for the playback mode of operation wherein information stored in the auxiliary memory unit 412 is transferred to the memory of the computer 72. This program is essentially similar to the LOAD program described in the aforereferenced MEK6800D2 Manual.

The record and playback programs are called up by the computer 72 in response to an operator touching selected areas of the control panel 85 on the control module 83 in a predetermined sequence. Thus, in order to call up the record program from the Mode Entry state:
1. The operator touches the Set-Up pad 126.
2. The operator touches the Manual Sew pad 124.
3. The operator touches the Entry pad 130.
4. "RECD" is indicated in the display windows 87-90.
5. An audible indication is given to the operator.
6. The operator starts the cassette recorder 412 in its record mode.
7. Recording continues until finished and the system returns to its Mode Entry state.

In order to call up the playback program from the mode state:
1. The operator touches the Set-Up pad 126.
2. The operator touches the Manual Sew pad 124.
3. The operator touches the Set-Up pad 126 a second time.
4. The operator touches the Entry 130.
5. "PLAY" is indicated in the display windows 87-90.
6. An audible indication is provided to the operator.
7. The operator starts the cassette recorder 412 in its play mode.
8. Playback continues until finished and the system returns to its Mode Entry state.

The aforedescribed system is semi-automatic in operation, regarding the operator control of the auxiliary memory unit 412. It is understood that a completely automatic system controlled by the computer 72 is contemplated as being within the scope of this invention. Such a system would include start, stop, forward, rewind, interrecord search, all operating under programmed direction. Further, although a cassette recorder has been disclosed as the auxiliary memory unit 412, it is also contemplated that other types of memory units utilizing non-volatile replaceable memory media may be substituted.

Accordingly, there has been disclosed an arrangement for utilizing an auxiliary memory unit to increase the memory capacity of a programmable industrial sewing system. It is understood that the above-described arrangement is merely illustrative of the application of the principles of this invention. Numerous other arrangements may be derived by those skilled in the art without departing from the spirit and scope of this invention, as defined by the appended claims.

APPENDIX A

RECORD PROGRAM

| ADDRESS | INSTR. & IMMED. DATA | MNEMONIC LABEL | INSTR | MODIFIER | COMMENTS |
|---|---|---|---|---|---|
| B000 | 01 | RECORD | NOP | | No Operation |
| B001 | 01 | | NOP | | |
| B002 | 01 | | NOP | | |
| B003 | 01 | | NOP | | |
| B004 | 0F | | SEI | | Set Interrupt Mask |
| B005 | 01 | | NOP | | (to Mask out RTC, |
| B006 | 01 | | NOP | | Phase 10 Inter- |
| B007 | 01 | | NOP | | rupt During Record) |
| B008 | 01 | | NOP | | |
| B009 | 86 | | LDAA | I,03 | Preset ACIA |
| B00A | 03 | | | | |
| B00B | B7 | | STAA | Loc AFE6 | |
| B00C | AF | | | (ACIA Control | |
| B00D | E6 | | | REG) | |
| B00E | 01 | | NOP | | No Operation, Mach Code 01, Here thru B021 |
| B022 | BD | | JSR | BEG. & END | Define Beginning & |
| B023 | B0 | | | | Ending Addresses |
| B024 | C0 | | | | To be Recorded |
| B025 | 01 | | NOP | | |
| B026 | 01 | | NOP | | |
| B027 | 86 | PNCH | LDA | I 51 | Start Punch Program |
| B028 | 51 | | (51) | | |
| B029 | B7 | | STA | ACIA, Loc | Init. ACIA, 8 Bit |
| B02A | AF | | | AFE6 (Control | Char PAR2 Stop |
| B02B | E6 | | | REG) | Divide by 16 With RTS Not High |
| B02C | 01 | | NOP | | |
| B02D | 01 | | NOP | | |
| B02E | CE | | LDX | I, 03FF | Load Index Register |
| B02F | 03 | | | | With 1024$_D$ for |
| B030 | FF | | | | Tape Leader |
| B031 | 01 | | NOP | | |
| B032 | 01 | | NOP | | |
| B033 | BD | | JSR | PUNCH LEADER | Punch Leader Sub- |
| B034 | B0 | | | | routine |
| B035 | E0 | | | | |
| B036 | 01 | | NOP | | |
| B037 | 01 | | NOP | | |
| B038 | F6 | PUND 10 | LDA,B | End. Addr+1 | Load Starting & End- |
| B039 | 00 | | | 003E | ing Addresses into |
| B03A | 3E | | | | temporary RAM Registers |
| B03B | F0 | | SUB,B | Beg. Addr+1 | |
| B03C | 00 | | | 003C | |
| B03D | 3C | | | | |
| B03E | 01 | | NOP | | |
| B03F | 01 | | NOP | | |
| B040 | B6 | | LDA,A | End Addr | Load Starting & End- |
| B041 | 00 | | | (003D) | ing Addresses into |
| B042 | 3D | | | | Temporary RAM Reg- |
| B043 | B2 | | SBC,A | Beg. Addr | isters (Continued) |
| B044 | 00 | | | (003B) | |
| B045 | 3B | | | | |
| B046 | 27 | | BEQ | PUND 25 | Branch (to B04C) if |
| B047 | 04 | | | | Block Length is less than 255 Bytes |
| B048 | C6 | | LDA,B | I (FF) | More than 255 set |
| B049 | FF | | | | Block Length to 256 |
| B04A | 01 | | NOP | | Bytes |
| B04B | 01 | | NOP | | |
| B04C | 86 | PUND 25 | LDA, | I,(ASCII | Punch ASCII "B" |
| B04D | 42 | | | "B") | (Start Code) |
| B04E | BD | | JSR | OUTPUT | |
| B04F | B0 | | | (Loc B0F0) | |
| B050 | F0 | | | | |
| B051 | 01 | | NOP | | |
| B052 | 01 | | NOP | | |
| B053 | 37 | | PSH,B | | |
| B054 | 30 | | TSX | | |
| B055 | BD | | JSR | PUNCH | |
| B056 | B1 | | | (Loc B100) | |
| B057 | 00 | | | | |
| B058 | 01 | | NOP | | |
| B059 | 01 | | NOP | | |
| B05A | 32 | | PUL A | | Get Byte Count |

APPENDIX A-continued
RECORD PROGRAM

| ADDRESS | INSTR. & IMMED. DATA | MNEMONIC LABEL | INSTR | MODIFIER | COMMENTS |
|---|---|---|---|---|---|
| B05B | 4C | | INC A | | Adjust it |
| B05C | B7 | | STA A | (Reg 003F) | Store Byte Count in |
| B05D | 00 | | | | Reg 003F |
| B05E | 3F | | | | |
| B05F | 01 | | NOP | | |
| B060 | CE | | LDX | Beg. Addr. | Loads Contents of 00 & 3B into Index Register |
| B061 | 00 | | | (Reg. 003B) | |
| B062 | 3B | | | | |
| B063 | BD | | JSR | PUN | |
| B064 | B1 | | | (Loc B100) | |
| B065 | 00 | | | | |
| B066 | BD | | JSR | PUN | |
| B067 | B1 | | | (Loc B100) | |
| B068 | 00 | | | | |
| B069 | 01 | | NOP | | |
| B06A | 01 | | NOP | | |
| B06B | FE | | LDX | Beg. Add. | Punch Data |
| B06C | 00 | | | (Reg. 003B) | |
| B06D | 3B | | | | |
| B06E | BD | PUND 30 | JSR | PUNCH | |
| B06F | B1 | | | (Loc B100) | |
| B070 | 00 | | | | |
| B071 | 7A | | DEC | (Temp Reg. | |
| B072 | 00 | | | (003F) | |
| B073 | 3F | | | | |
| B074 | 26 | | BNE | PUND 30 | Done Yet? |
| B075 | F8 | | | | Yes |
| B076 | FF | | STX | Beg Addr. | Save XR Valve |
| B077 | 00 | | | (Reg 003B) | |
| B078 | 3B | | | | |
| B079 | CE | | LDX | I 0019 (25D) | |
| B07A | 00 | | | | |
| B07B | 19 | | | | |
| B07C | BD | | JSR | PUNCH LEADER | Punch 25 "ones" |
| B07D | B0 | | | (Loc B0E0) | |
| B07E | E0 | | | | |
| B07F | 01 | | NOP | | |
| B080 | FE | | LDX | Beg Addr. | Restore Index Reg. |
| B081 | 00 | | | (Reg. 003B) | |
| B082 | 3B | | | | |
| B083 | 09 | | DEX | | |
| B084 | 01 | | | | |
| B085 | BC | | CPX | Ending Addr. | Compare Index Reg. |
| B086 | 00 | | | (Reg. 003D) | With Contents of |
| B087 | 3D | | | | End Addr. A004, A005 |
| B088 | 26 | | BNE | PUND 10 | Jump to PUND 10 if |
| B089 | AE | | | | not Equal to Zero |
| B08A | 01 | | NOP | | |
| B08B | 01 | | NOP | | |
| B08C | 86 | | LDA | A, 47 | Load Accum A, With |
| B08D | 47 | | | | ASCII Char "G" |
| B08E | BD | | JSR | Output | |
| B08F | B0 | | | (Loc B0F0) | |
| B090 | F0 | | | | |
| B091 | 01 | | NOP | | |
| B092 | CE | TIMER | LDX,I | FFFF | Ending Signal Time |
| B093 | FF | | | | Delay (1.7 seconds) |
| B094 | FF | | | | |
| B095 | 09 | | DEX | | |
| B096 | 26 | | BNE | | |
| B097 | FD | | | | |
| B098 | 01 | | NOP | | |
| B099 | 86 | | LDAA | I, 03 | Reset ACIA |
| B09A | 03 | | | | |
| B09B | 01 | | NOP | | |
| B09C | B7 | | STA | ACIA Control | |
| B09D | AF | | | (Loc AFE6) | |
| B09E | E6 | | | | |
| B09F | 01 | | NOP | | |
| B0A0 | 0E | | CLI | | Reset Interrupt Mask |
| B0A1 | 01 | | NOP | | (to Enable Function of Normal RTC, Phase 10 Interrupts) |
| B0A2 | 01 | | | | No Operation, Mach. Code 01, Here Thru |

APPENDIX A-continued

RECORD PROGRAM

| ADDRESS | INSTR. & IMMED. DATA | LABEL | MNEMONIC INSTR | MODIFIER | COMMENTS |
|---|---|---|---|---|---|
| | | | | | B0AE |
| B0AF | 39 | | RTS | | Return |

Locations B0B0 thru B0BF are unused.

APPENDIX B

PLAYBACK PROGRAM

| ADDRESS | INSTR. & IMMED. DATA | LABEL | MNEMONIC INSTR. | MODIFIER | COMMENTS |
|---|---|---|---|---|---|
| B400 | 01 | PLAYBACK | NOP | | Playback Initialization |
| B401 | 01 | | | | |
| B402 | 01 | | | | |
| B403 | 01 | | | | |
| B404 | 0F | | SEI | | Set Interrupt Mask |
| B405 | 01 | | | | (To Mask Out RTC, |
| B406 | 01 | | | | Phase 10 Interrupt |
| B407 | 01 | | | | During Playback) |
| B408 | 01 | | | | |
| B409 | 86 | | LDA,A | I,03 | Preset ACIA |
| B40A | 03 | | | | |
| B40B | B7 | | STAA | ACIA (Control) | |
| B40C | AF | | | | |
| B40D | E6 | | | | |
| B40E | 01 | | NOP | | No Operation here thru B421 |
| B422 | BD | | JSR | BEG & END | Define Beginning & |
| B423 | B0 | | | (Loc B0C0 | Ending Addresses |
| B424 | C0 | | | | To Be Recorded |
| B425 | 01 | | NOP | | |
| B426 | 01 | | NOP | | |
| B427 | 7E | | JMP | LOAD | Jump to Load at B490 |
| B428 | B4 | | | (Loc B490) | |
| B429 | 90 | | | | |
| | | Locations B42A thru B43F are unused | | | |
| B440 | 01 | RETURN | NOP | | |
| B441 | 01 | SEQ | | | |
| B442 | 01 | | | | |
| B443 | CE | TIMER | LDX,I | FFFF | Ending Time Delay |
| B444 | FF | | | | (1.7 Secs) |
| B445 | FF | | | | |
| B446 | 09 | | DEX | | |
| B447 | 26 | | BNE | | |
| B448 | FD | | | | |
| B449 | 01 | | NOP | | |
| B44A | 01 | | NOP | | |
| B44B | 86 | | LDA,A | 03 | Reset ACIA |
| B44C | 03 | | | | |
| B44D | 01 | | | | |
| B44E | B7 | | STA,A | ACIA Control | |
| B44F | AF | | | (Loc AFE6) | |
| B450 | E6 | | | | |
| B451 | 01 | | NOP | | |
| B452 | 01 | | NOP | | |
| B453 | 0E | | CLI | | Reset Interrupt Mask |
| B454 | 01 | | NOP | | No Operation, Mach Code 01, Here Thru B45E |
| B45F | 39 | | RTS | | |
| | | Locations B460 thru B48F are unused | | | |
| B490 | 86 | LOAD | LDA | 10 | Initialize ACIA to |
| B491 | 10 | | | | to Divide by 1 in |
| B492 | B7 | | STA,A | ACAIS | Receive Mode |
| B493 | AF | | | (Loc AFE6) | |
| B494 | E6 | | | | |
| B495 | 01 | | NOP | | |
| B496 | BD | BILD | JSR | INPUT CHAR | Has AscII Char "B" |
| B497 | B4 | | | (Loc B4C0) | Been Received? |
| B498 | C0 | | | | (Start of Block) |
| B499 | 81 | | CMP,A | | |
| B49A | 42 | | | | |
| B49B | 27 | | BEQ | READ BLOCK | |
| B49C | 08 | | | | |
| B49D | 81 | | CMP,A | | Has AscII Char "G" |
| B49E | 47 | | | | Been Received? (End |
| B49F | 26 | | BNE | BILD | of File) |

APPENDIX B-continued

PLAYBACK PROGRAM

| ADDRESS | INSTR. & IMMED. DATA | LABEL | MNEMONIC INSTR. | MODIFIER | COMMENTS |
|---|---|---|---|---|---|
| B4A0 | F5 | | | | |
| B4A1 | 01 | | NOP | | |
| B4A2 | 7E | | JMP | RETURN SEQ | Memory Load Complete |
| B4A3 | B4 | | | (Loc B440) | Jump to "Return" |
| B4A4 | 40 | | | | Sequence |
| B4A5 | 8D | READ BLOCK | BSR | INPUT CHAR | Get Byte Count |
| B4A6 | 19 | | | | |
| B4A7 | 16 | | TAB | | Put Byte Count Into |
| B4A8 | 5C | | INC,B | | ACCM B Adjust it |
| B4A9 | 8D | | BSR | INPUT CHAR | Get Starting Addr. Hi |
| B4AA | 15 | | | | Byte (From Reg 003B) |
| B4AB | B7 | | STA,A | (Beg Addr) | |
| B4AC | 00 | | | (Reg 003B) | |
| B4AD | 3B | | | | |
| B4AE | 8D | | BSR | INPUT CHAR | Get Starting Addr 10 |
| B4AF | 10 | | | | Byte (From Reg 003C) |
| B4B0 | B7 | | STA,A | Beg Addr + 1 | |
| B4B1 | 00 | | | (Reg 003C) | |
| B4B2 | 3C | | | | |
| B4B3 | FE | | LDX | Beg Addr | Beg Addr to X Reg |
| B4B4 | 00 | | | (Reg 003B) | |
| B4B5 | 3B | | | | |
| B4B6 | 8D | ST BLOCK | BSR | INPUT CHAR | Not Done |
| B4B7 | 08 | | | | |
| B4B8 | A7 | | STA,A | X | Store [A] in Memory |
| B4B9 | 00 | | | | Loc Designated by X Reg |
| B4BA | 08 | | INX | | Increment Address |
| B4BB | 5A | | DEC,B | | Decrement Byte Count |
| B4BC | 26 | | BNE | ST BLOCK | Branch Back if Not Done |
| B4BD | F8 | | | | |
| B4BE | 20 | | BRA | BILD | |
| B4BF | DA | | | | |
| B4C0 | B6 | INPUT CHAR | LDA,A | ACIAS | |
| B4C1 | AF | | | (Loc AFE6) | |
| B4C2 | E6 | | | | |
| B4C3 | 47 | | ASR,A | | |
| B4C4 | 24 | | BCC | INPUT CHAR | Is Data Ready? |
| B4C5 | FA | | | | |
| B4C6 | B6 | | LDA, | ACIAD | |
| B4C7 | AF | | | | Input Character |
| B4C8 | E7 | | | | |
| B4C9 | 39 | | RTS | | End of Playback Program |

APPENDIX C

RECORD/PLAYBACK PROGRAM SUBROUTINES

| ADDRESS | INSTR. & IMMED. DATA | LABEL | MNEMONIC INSTR | MODIFIER | COMMENTS |
|---|---|---|---|---|---|
| B0C0 | 86 | BEG&END | LDA,A | I, 80 | Load Starting and |
| B0C1 | 80 | | | | Ending Addrs. of Customers Programs To Be |
| B0C2 | B7 | | STA,A | (REG 003B) | Recorded (RAM Locs.) |
| B0C3 | 00 | | | | Reg 003B: Hi Byte |
| B0C4 | 3B | | | | Starting Addresses |
| B0C5 | 01 | | NOP | | Enter 80 |
| B0C6 | 86 | | LDA,A | I,9A | Reg 003C: Low Byte |
| B0C7 | 9A | | | | Starting Address |
| B0C8 | B7 | | STA,A | (Reg 003C) | Enter 9A |
| B0C9 | 00 | | | | |
| B0CA | 3C | | | | |
| B0CB | 01 | | NOP | | |
| B0CC | 86 | | LDA,A | I,87 | Reg. 003D: Hi Byte |
| B0CD | 87 | | | | Ending Address |
| B0CE | B7 | | STA,A | (Reg 003D) | Enter 87 |
| C0CF | 00 | | | | |
| B0D0 | 3D | | | | |
| B0D1 | 01 | | NOP | | |
| B0D2 | 86 | | LDA,A | I,FF | Reg. 003E: Lo Byte |
| B0D3 | FF | | | | Ending Address |
| B0D4 | B7 | | STA,A | (Reg 003E) | Enter FF |

APPENDIX C-continued

RECORD/PLAYBACK PROGRAM SUBROUTINES

| ADDRESS | INSTR. & IMMED. DATA | LABEL | MNEMONIC INSTR | MODIFIER | COMMENTS |
|---|---|---|---|---|---|
| B0D5 | 00 | | | | |
| B0D6 | 3E | | | | |
| B0D7 | 01 | | NOP | | |
| B0D8 | 39 | | RTS | | |
| | | Locations B0D9 thru B0DF are unused | | | |
| B0E0 | 86 | PUNCH | LDA,A | FF | Output All "Ones" |
| B0E1 | FF | LEADER | | | |
| B0E2 | BD | | JSR | OUTPUT | |
| B0E3 | B0 | | | | |
| B0E4 | F0 | | | | |
| B0E5 | 09 | | DEX | | Dec Counter |
| B0E6 | 26 | | BNE | PUNCH LEADER | |
| B0E7 | F8 | | | | |
| B0E8 | 39 | RTS | | | |
| | | Locations B0E9 Thru B0EF are Unused | | | |
| B0F0 | 37 | OUTPUT | PSH,B | | Save B |
| B0F1 | F6 | OUTC 1 | LDA,B | | Is Data Ready Yet? |
| B0F2 | AF | | | | (Load ACCM B With |
| B0F3 | E6 | | | | Contents of ACIA |
| B0F4 | 57 | | ASR,B | | Status Reg.) |
| B0F5 | 57 | | ASR,B | | |
| B0F6 | 24 | | BCC | | Branch Back if not |
| B0F7 | F9 | | | | Ready Yet |
| B0F8 | B7 | | STA,A | (ACIA Data | Output one Character |
| B0F9 | AF | | | Reg) | |
| B0FA | E7 | | | | |
| B0FB | 33 | | Pul B | | Restore B |
| B0FC | 01 | | NOP | | |
| B0FD | 01 | | NOP | | |
| B0FE | 01 | | NOP | | |
| B0FF | 39 | | RTS | | |
| B100 | A6 | PUNCH | LDA,A | X | Get Data From Addrs. |
| B101 | 00 | | | | in Index Reg. - Do |
| B102 | BD | | JSR | OUTPUT | not incr. (00) and |
| B103 | B0 | | | | Punch it |
| B104 | F0 | | | | |
| B105 | 08 | | INX | | Update Addrs. (Incr. |
| B106 | 39 | | RTS | | I REG) |
| | | Locations B107 thru B3FF are unused | | | |

We claim:

1. In a programmable sewing system comprising; a sewing machine having a plurality of manually and automatically operable components;

a computer having a memory, a plurality of input terminals coupled to said sewing machine for receiving thereat input signals indicative of operation of said components of said sewing machine and a plurality of output terminals coupled to said sewing machine for providing thereat output signals for controlling the operation of said components of said sewing machine;

manually actuated control means coupled to said computer for entering sewing instructions;

said sewing system having a first mode of operation selected by way of said control means wherein said computer receives at said plurality of input terminals, and retains in said memory, signals indicative of manual operation of said components of said sewing machine, including a count of the repetitive component operation of certain of said components, and a time duration for operation of certain others of said components;

said sewing system further having a second mode of operation selected by way of said control means wherein said computer provides said output signals for controlling the operation of said components of said sewing machine, including said count of said repetitive component operation of said certain of said sewing machine components and said time duration for operation of certain others of said sewing machine components according to said signals retained in said memory in said first mode of operation;

the improvement comprising:

an auxiliary memory unit; and interface means operatively connecting said auxiliary memory unit to said computer for transferring information between said computer memory and said auxiliary memory unit.

2. The improvement according to claim 1 wherein said auxiliary memory unit is adapted to receive a replaceable memory medium.

3. The improvement according to claim 2 wherein said auxiliary memory unit includes a magnetic tape cassette recorder/player.

4. The improvement according to claim 3 wherein said interface means includes means for converting signals stored in said computer memory into audio signals for storage on said magnetic tape.

5. The improvement according to claim 4 wherein said interface means includes means for converting audio signals stored in said magnetic tape into appropriate signals suitable for storage in said computer memory.

6. The improvement according to claim 1 wherein said computer memory stores information in the form of multi-bit bytes and said auxiliary memory unit stores information in serial form, said interface means including a parallel to serial converter.

* * * * *